April 9, 1935.  L. GRUBB  1,996,994
BEARING
Filed Dec. 24, 1932
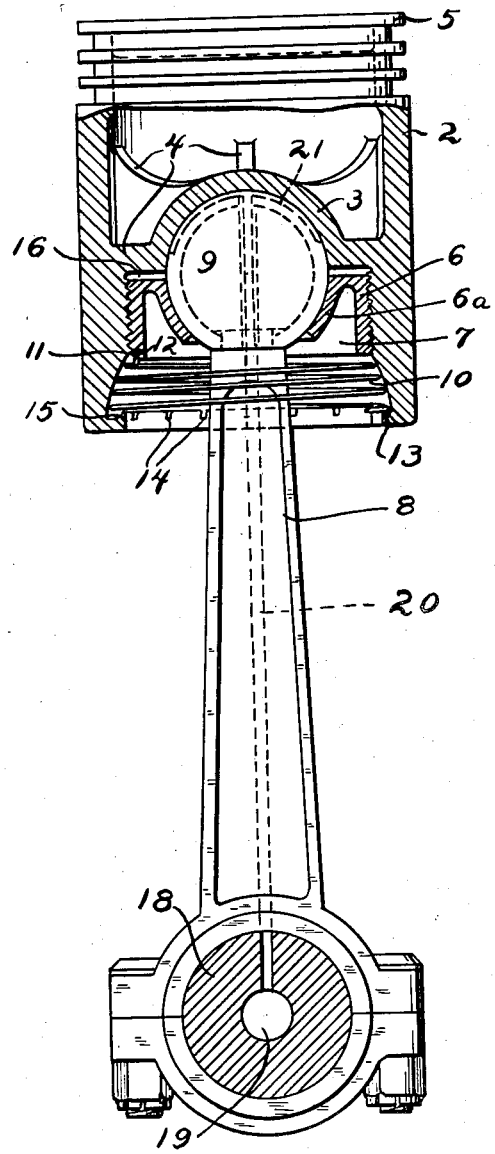
INVENTOR
Lee Grubb
BY
ATTORNEY Patented Apr. 9, 1935

1,996,994

UNITED STATES PATENT OFFICE 1,996,994

BEARING

Lee Grubb, Dearborn, Mich.

Application December 24, 1932, Serial No. 648,758

1 Claim. (Cl. 287—87)

This invention relates to bearings, and although particularly adapted to connecting rod bearings such as those of heat engines, compressors, and the like, having one or more reciprocable pistons coupled to a crank shaft or its equivalent by means of connecting rods, it will be seen to be equally applicable to bearings of other and all sorts. An important object of the invention is the provision of such bearings which are self-adjusting and in which wear is automatically compensated for by self-acting take-up means tending constantly to keep the bearing clearance at a desired minimum.

Another object of the invention is the provision of a bearing incorporating automatic take-up means in which the force exerted thereby and tending to hold the bearing sections tightly against the supported journaled or rotatable part may be easily adjusted, so that such take-up means constantly provides a desired tightness of the bearing.

Other objects and advantages will be apparent from the following description, wherein reference is made to the accompanying drawing illustrating a preferred embodiment of my invention, and wherein similar reference numerals designate similar parts throughout the several views.

The single figure of drawing shows partly in diametrical cross section and partly in side elevation a piston and connecting rod assembly in which the bearing which couples the parts is provided with take-up means according to the principles of my invention.

Reference character 2 designates a piston, shown as of the trunk type, having in place of the more usual wrist pin bosses a partly spherical connecting rod bearing section 3, supported from the skirt of the piston by means of webs 4. The head or ringland section 5 of the piston may be formed separately and later welded or otherwise suitably secured in place, (if desired) to facilitate casting of the webs 4. It will be apparent, moreover, that the connecting rod bearing portion 3 might be of cylindrical rather than spherical form if desired.

The other complementary portion 6ᵃ of the bearing is carried by a screw 6 threaded in the lower portion of the skirt of the piston, which is tapped to receive it. The partly spherical lower bearing section 6ᵃ carried by the screw is open at its bottom, as at 7, to provide clearance for and enable extension therethrough of the connecting rod 8, which carries at its top and within the spherical bearing a ball 9. The connecting rod and ball may be separately formed and the ball welded or otherwise secured upon the end of the rod after the nut has been placed upon the latter, or if desired, the screw may be formed in sections, since when threaded into place a sectional screw could not separate in any event.

Take-up means is provided tending constantly to tighten bearing screw 6. This may comprise a torsion spring, as 10, the upper end of which is bent upwardly, as at 11, and projects into a recess 12 in the bearing screw. The lower spring extremity 13 is bent radially inwardly and adapted to engage in any one of a plurality of notches 14 formed in the reentrantly upturned lower extremity 15 of the skirt of the piston.

It will be seen that in assembling such a connecting rod, piston and bearing structure, ball 9 may first be placed in the socket 3 and the bearing screw 6 then tightened to a desired extent. The lower laterally bent spring end 13 is then placed in whichever of the notches 14 will cause the spring to exert the proper tightening torque upon the bearing screw, and it will be understood that when the assembly is placed in service, wear which occurs between the ball 9 and the bearing surfaces 3—6ᵃ, will automatically and instantly be compensated for by tightening of the bearing screw, which thus tightens the bearing sections upon the ball. Clearance, as at 16, is of course initially left between the bearing sections to permit such tightening.

In the embodiment shown, a drilled crank shaft (18) is indicated, the oil channel being designated 19. The connecting rod is also drilled as at 20 in the conventional manner to conduct oil to the connecting rod bearing, and this latter channel (20) may communicate with oil channels 21 formed in the ball. Oil delivered in the manner shown will of course lubricate both the bearing and the screw threads.

Not only does the constant force exerted by the spring upon the combined bearing and take up screw prevent any harmful and undesirable bearing sloppiness from ever developing, but the use of a ball and socket bearing in the manner disclosed entirely obviates any necessity for lining up bearings in the manner necessary with piston pin bearings, while the freedom of the piston to turn in the cylinder, which it will of course do to some extent in service, eliminates any danger of the piston wearing eccentric. The disclosed oiling arrangement also lubricates in a novel and efficient manner both the bearing and the screw, and as well may assist in cooling the piston. It will further be seen that the single combined take up and bearing screw made possible by the provision of the ball and socket type juncture makes for extreme simplicity, and that cheapness of manufacture is also furthered by the fact that the automatic take-up makes extreme care in finishing the bearing surfaces unnecessary. The low positioning of the bearing relatively to the piston also prevents the skirt slap difficulties so commonly developed by pistons with bearings arranged close to the head—which, in tending to rock upon supporting piston pins due to uneven or lateral application of forces both by explosion and compression and by their connecting rods, drive their skirt portions against cylinder walls with consequent damage to both.

While it will be apparent that the illustrated embodiment of my invention herein disclosed is well calculated to adequately fulfill the objects and advantages stated, it is to be understood that the invention is susceptible to variation, modification and change within the spirit and scope of the subjoined claim.

What I claim is:

In a connection between a piston and a connecting rod, wherein the rod is provided with a substantially spherically shaped end and the piston is provided with correspondingly shaped seats, one of which is fixed and the other movable, means for automatically adjusting said movable seat, to compensate for the wear between the parts, comprising a coil spring having one end anchored in said movable seat and the other end seated on a flange at the open end of the piston, said flange being provided with a plurality of recesses adapted to be selectively engaged by anchoring means carried by the second mentioned end of the spring for varying the tension of the spring.

LEE GRUBB.